(12) United States Patent
Czaplicki et al.

(10) Patent No.: US 6,706,772 B2
(45) Date of Patent: Mar. 16, 2004

(54) TWO COMPONENT (EPOXY/AMINE) STRUCTURAL FOAM-IN-PLACE MATERIAL

(75) Inventors: Michael J. Czaplicki, Rochester, MI (US); David J. Kosal, Richmond, MI (US); Keith Madaus, Goodwells, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/301,948

(22) Filed: Nov. 22, 2002

(65) Prior Publication Data

US 2003/0105175 A1 Jun. 5, 2003

Related U.S. Application Data

(63) Continuation of application No. 09/847,252, filed on May 2, 2001.

(51) Int. Cl.[7] ............................... C08J 9/32; B01J 13/02
(52) U.S. Cl. ......................... 521/54; 521/135; 521/178
(58) Field of Search ........................... 521/54, 135, 178

(56) References Cited

U.S. PATENT DOCUMENTS

| | | |
|---|---|---|
| 4,427,481 A | 1/1984 | Smith et al. |
| 4,538,380 A | 9/1985 | Colliander |
| 4,693,775 A | 9/1987 | Harrison et al. |
| 4,724,243 A | 2/1988 | Harrison |
| 4,749,434 A | 6/1988 | Harrison |
| 4,769,166 A | 9/1988 | Harrison |
| 4,898,630 A | 2/1990 | Kitoh et al. |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 5,124,186 A | 6/1992 | Wycech |
| 5,266,133 A | 11/1993 | Hanley et al. |
| 5,470,886 A | 11/1995 | Makhlouf et al. |
| 5,475,039 A | 12/1995 | Butikofer |
| 5,648,401 A | 7/1997 | Czaplicki |
| 5,712,317 A | 1/1998 | Makhlouf et al. |
| 5,783,272 A | 7/1998 | Wong |
| 5,884,960 A | 3/1999 | Wycech |
| 5,894,071 A | 4/1999 | Merz et al. |
| 5,932,680 A | 8/1999 | Heider |
| 5,948,508 A | 9/1999 | Pastore et al. |
| 5,964,979 A | 10/1999 | George et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A | 2/2000 | Johnson et al. |
| 6,040,350 A | 3/2000 | Fukui |
| 6,057,382 A | 5/2000 | Karim et al. |
| 6,077,884 A | 6/2000 | Hess et al. |
| 6,096,791 A | 8/2000 | Born et al. |
| 6,103,784 A | 8/2000 | Hilborn et al. |
| 6,133,335 A | 10/2000 | Mahoney et al. |
| 6,136,398 A | 10/2000 | Willett et al. |
| 6,136,944 A | 10/2000 | Stewart et al. |
| 6,153,302 A | 11/2000 | Karim et al. |
| 6,162,504 A | 12/2000 | Hubert et al. |
| 6,174,932 B1 | 1/2001 | Pachl et al. |
| 6,218,442 B1 | 4/2001 | Hilborn et al. |
| 6,228,449 B1 | 5/2001 | Meyer |
| 6,232,433 B1 | 5/2001 | Narayan |

(List continued on next page.)

FOREIGN PATENT DOCUMENTS

| | | |
|---|---|---|
| EP | 0 442 178 A1 | 8/1991 |
| JP | 4059820 | 2/1992 |
| WO | WO 97/02967 | 1/1997 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 00/12571 | 3/2000 |
| WO | WO 00/12595 | 3/2000 |
| WO | WO 00/13876 | 3/2000 |
| WO | WO 00/20483 | 4/2000 |
| WO | WO 00/37242 | 6/2000 |
| WO | WO 00/37554 | 6/2000 |
| WO | WO 00/39232 | 7/2000 |
| WO | WO 00/40629 | 7/2000 |
| WO | WO 00/52086 | 9/2000 |
| WO | WO 01/57130 | 8/2001 |
| WO | WO 01/88033 | 11/2001 |

OTHER PUBLICATIONS

"The Epoxy Book", A System Three Resins Publication, pp. 1–41, System Three Resins, Inc., Seattle, Washington.
"Epoxy Resins", Second Edition Encyclopedia of Polymer Science and Engineering, vol. 6, pp. 322–382, 1985.
Excerpt from http://www.uniroyalchemical.com/tips/tip_0699_1.htm.
PCT International Search Report For International Application No. PCT/US02/03133 dated Oct. 23, 2002.
Written Opinion dated Mar. 11, 2003.
Excerpt from http://www.iprod.auc.dk/forsk/poly/student/ballon.htm.
Excerpt from http://www.fibreglast.com/FillerPage.htm.
PCT International Search Report For International Application No. PCT/US02/03133 dated Oct. 23, 2002.

*Primary Examiner*—Morton Foelak
(74) *Attorney, Agent, or Firm*—Dobrusin & Thennisch PC

(57) ABSTRACT

The present invention relates to methods, materials, and products for forming a foamed product, comprising the steps of combining an epoxy-based component with an amine-based component. The epoxy component is cross-linked through a polymerization reaction catalyzed by the amine formulation. In this regard, a reactive mixture or exothermic reaction is created between the epoxy component and the amine component when combined. The heat generated by the exothermic reaction softens a thermoplastic shell of a blowing agent formulated within the epoxy component thereby enabling a solvent core within the thermoplastic shell of the blowing agent to expand from the heat generated by the exothermic reaction.

20 Claims, No Drawings

U.S. PATENT DOCUMENTS

| | | |
|---|---|---|
| 6,235,842 B1 | 5/2001 | Kuwano et al. |
| 6,263,635 B1 | 7/2001 | Czaplicki |
| 6,277,898 B1 | 8/2001 | Pachl et al. |
| 6,287,669 B1 | 9/2001 | George et al. |
| 6,303,672 B1 | 10/2001 | Papalos et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 | 2/2002 | Feichtmeier et al. |
| 6,376,564 B1 | 4/2002 | Harrison |
| 6,419,305 B1 | 7/2002 | Larsen |
| 6,432,475 B1 | 8/2002 | Yamamoto et al. |
| 6,437,055 B1 | 8/2002 | Moriarity et al. |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| H2047 H | 9/2002 | Harrison et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,479,560 B2 | 11/2002 | Freitag et al. |
| 6,486,256 B1 | 11/2002 | Tarbutton et al. |
| 6,506,494 B2 | 1/2003 | Brandys et al. |
| 2002/0009582 A1 | 1/2002 | Golden |
| 2002/0120064 A1 | 8/2002 | Khandpur et al. |
| 2002/0123575 A1 | 9/2002 | Kato et al. |
| 2002/0136891 A1 | 9/2002 | Khandpur et al. |
| 2002/0137808 A1 | 9/2002 | Gehlsen et al. |
| 2003/0060522 A1 | 3/2003 | Czaplicki et al. |
| 2003/0060523 A1 | 3/2003 | Czaplicki |

…

TWO COMPONENT (EPOXY/AMINE) STRUCTURAL FOAM-IN-PLACE MATERIAL

This is a continuation application of Ser. No. 09/847,252 filed May 2, 2001.

FIELD OF THE INVENTION

The present invention relates generally to foam-in-place structural materials used for reinforcement of structural members. More particularly, the present invention relates to a two-component epoxy/amine foamed material exhibiting improved mechanical properties (good balance of high compressive strength, compressive modulus, glass transition temperature and cured ductility) as well as enhanced shear-thinning characteristics.

BACKGROUND OF THE INVENTION

Traditional foam-in-place structural materials known in the art generally disclose polyurethane materials, polyurea, or epoxy-based materials. These materials incorporate a method to create volumetric expansion and a curing mechanism as well to effectuate curing at room temperature and achieve a degree of control of expansion and cure rate characteristics. Although these prior art materials are both useful and successful in a number of applications, certain structural reinforcement applications in the automotive industry, for example, would benefit from a material having an improved balance of mechanical properties, such as a higher compressive strength, little change in modulus over a broad temperature range and a glass transition temperature that exceeds 200° F. In addition, improved cured ductility that enables the material to deform plastically when stresses exceeding the material yield strength are applied would provide definite benefit. Further, these structural reinforcement characteristics in many applications, including automotive, may also benefit from a shear-thinning structural material which exhibits an increased viscosity at zero shear rate and a decreased viscosity at higher shear rates prior to curing. This enables the material to flow more easily while being dispensed but then have flow minimally following dispensing. This shear thinning behavior can also assist with the development of a uniform, consistent foamed cell structure by allowing more effective foaming gas entrapment.

As known by those skilled in the art, a number of factors determine the suitability of a process for forming a foamed product of the type in which a blowing agent forms cells in a synthetic resin as the resin is cured. Most significantly, the interaction of the rate of cure and the rate at which the blowing gas is generated must be matched to create the proper cured product. If the resin cures too rapidly there is inadequate time for the gas to form the proper size and number of gas voids in the finished product. Over expansion of the forming foam product must also be avoided. Rapid expansion due to a slow cure rate relative to gas evolution may cause the expanding foam to simply collapse as a result of inadequate wall strength surrounding the individual gas cells.

A number of prior art techniques are available to control the rate of foam expansion and the cure rate. For example, a wide-range of reactivities are available in commercial resins and curing agents. In addition, resins are available in a range of viscosities, which is another parameter and can be used to control the foam expansion rate. That is, it is known that a low viscosity resin can generally be expanded to a greater volume with a given volume of gas than a higher viscosity material; however, the resin must have sufficient viscosity to contain the gas at the pressures at which it is generated in order for the foam to be properly formed.

With respect to automotive applications, foamed products must have good environmental resistance and, most significantly, in many applications they must protect metal from corrosion while maintaining adhesion to the substrate. In the past many foamed parts were made using polyurethane, which provides a number of desirable attributes. It is known, however, that alternatives to urethane-based foams or more precisely materials based on the reaction of the isocyanate chemical functional group are frequently more environmentally desirable, in part due to the potential for unreacted functional groups in the finished products and difficulty in handling isocyanate functional chemicals in manufacturing processes. In addition, the polyurethane materials found in the prior art fail to provide optimum mechanical properties, generally possessing lower elastic modulus strength and lower glass transition temperature than what is capable with epoxy-based materials. In comparison with polyurethane materials, however, the epoxy-based materials found in the prior art often exhibit both poor cured ductility and higher viscosity during dispensing.

Accordingly, there is a need in industry and manufacturing operations for a structural material, which exhibits improved mechanical properties, such as higher compressive strength, compressive modulus, and glass transition temperature, as well as better-cured ductility. The improved mechanical properties allow the structural material of the present invention to be capable of plastically deforming when loaded beyond its yield stress. However, unlike prior art materials, there is no significant reduction in modulus or glass transition temperature. In addition, there is a need for an improved material, which can be used in a variety of applications wherein one or both components utilize a thixotropic filler, which produces pronounced shear-thinning characteristics. By providing a material with excellent cured physical properties and desirable processing attributes, the present invention addresses and overcomes the shortcomings found in the prior art.

SUMMARY OF THE INVENTION

The present invention relates to methods, materials, and products for foam-in-place structural reinforcement of hollow structures such as automobile cavities. In one embodiment, the present invention comprises a two-component foam-in-place structural material for producing a foamed product. Though other resin systems are possible, the first component of the system includes an epoxy-based resin. Preferably, the first component is formulated with a physical blowing agent, and more preferably one having a shell or skin that will change state to provide volumetric increase to create expansion. For example, the shell is a thermoplastic that, upon heating, will melt or soften to enable a solvent core to expand the shell. The second component includes an amine, and is formulated with an agent for allowing the resulting material to exhibit ductility with little reduction in modulus, glass transition temperature, or both. It is contemplated that the amine of the present invention could be a primary or secondary amine. Generally speaking, the amine is an epoxy curing agent or modifier, and preferably, a high solids epoxy curing agent, though it could be a water-borne epoxy-curing agent. Other examples of an amine suitable for use in the present invention include polyamides, aliphatic amines, and cycloaliphatic amines as well as other agents that can function as accelerators or catalysts. An optional thixotropic filler is included in either or both of the first or second components, and possibly as a stand-alone component. In one embodiment, this additive preferably causes the material to have high viscosity at a near zero shear rate and low viscosity at a higher shear rate, which is more commonly known in the art as shear-thinning.

The present invention provides a method of forming a foamed product, which comprises the steps of combining the first component (with a blowing agent) with the second component (with a curing agent). The first component, preferably an epoxy, is cross-linked through a polymerization reaction with the second component of the formulation (e.g. an amine). In this regard, an exothermic reaction or reactive mixture is created between the-epoxy component and the amine component when combined. The heat generated by the exothermic reaction softens the thermoplastic shell of the blowing agent formulated within the epoxy component thereby enables the solvent core within the thermoplastic shell to expand the thermoplastic shell and thereby create expansion. In a preferred embodiment the mixture of materials is in liquid form. However, it is contemplated that the mixture of materials could also comprise a paste or solids of varying viscosities and textures.

DETAILED DESCRIPTION OF THE INVENTION

As used herein, all concentrations shall be expressed as percentages by weight unless otherwise specified.

The present invention relates generally to a two component structural foam-in-place material and method for making the same formed by cross-linking reactions between an epoxy resin and a curing agent that creates a three-dimensional covalent bond network. It is contemplated that the addition of a curing agent to the epoxy resin causes the resin to cure or harden into a rigidified cross-linked polymer. When an epoxy resin is mixed with a curing agent containing labile hydrogen atoms, the epoxy ring opens and reacts with the curative. Generally speaking, cured epoxy foams are produced using one of three types of curing agents, such as amines, polyphenols, and anhydrides. Cure of the foam is achieved by polyaddition whereby the cure reaction between the epoxy resin and a curing agent is typically exothermic and can generate a considerable amount of heat. The control of such heat and the exothermic reaction is an important consideration of the foam-in-place material of the present invention. Since the foam-in-place material of the present invention is particularly useful in the production of automobiles and other vehicles to maintain and/or increase the strength of structural members such as frame members, rails, rockers, pillars, radiator support beams, doors, hatches, reinforcing beams and the like, exothermic control prevents the charring or burning of the interior of the foam.

More particularly, the method and composition of the present invention has two main components: (1) an epoxy resin component formulated with a physical blowing agent having a thermoplastic shell with a solvent core, and (2) an amine curing agent component which, when cured, produces a material capable of plastically deforming when mechanically loaded with an insignificant reduction in modulus or glass transition temperature reduction when compared with traditional epoxy/amine systems. In addition, a thixotropic additive is formulated into one or both the first and second components, which produces shear-thinning characteristics useful for processing and generation of a foamed product. Moreover, the exothermic reaction generated by the combination or mixture of the first and second components serves to soften the physical blowing agent, which consists of a thermoplastic shell with a solvent core. As the thermoplastic shell softens, the solvent expands the shell to create an expanded particle. The preferred solvent and shell is selected for its expansion properties when exposed to the heat of the exothermic reaction, which occurs during polymerization. However, by using the preferred fillers, and less reactive amine functional materials such as an amine sold under the commercial name GVI 4040, excessive exotherm, which would otherwise be produced by the curing reaction (and which could produce charring), is prevented.

In a particularly preferred embodiment, the components or formulation of the present invention include the following:

Resin Component

The first or resin component of the present invention is selected for its structurally adhering characteristics and for imparting rigidity. Suitable resins may include a cross-linkable polymer and, more preferably an epoxy. The properties of advantageous epoxy resins are described, for example, in the chapter entitled "Epoxy Resins" in the Second Edition of the Encyclopedia of Polymer Science and Engineering, Volume 6, pp. 322–382 (1986). The preferred epoxy resin has a number average molecular weight of from about 350 to about 600 and, on average, each molecule of epoxy has from about 1.8 to about 2.5 epoxide functional groups. The preferred epoxy resin has a viscosity of from about 5,000 to 100,000 cps (Brookfield viscosity) at 70° F. and a specific gravity of from about 1.0 to about 1.4. As stated, the preferred form of the resin is a liquid and may further comprise a high viscosity resin with relatively low reactivity. Exemplary epoxy resins which could be utilized in the present invention include polyglycidyl ethers obtained by reacting polyhydric phenols such as bisphenol A, bisphenol F, bisphenol AD, catechol, resorcinol, or polyhydric alcohols such as glycerin and polyethylene glycol with haloepoxides such as epichlorohydrin; glycidylether esters obtained by reacting hydroxycarboxylic acids such as p-hydroxybenzoic acid or beta-hydroxy naphthoic acid with epichlorohydrin or the like; polyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may also be used in the present invention. For example, mixtures of liquid (at room temperature), semi-solid, and/or solid epoxy resins can be employed. A preferable epoxy resin for use in the present invention includes DER 331. As stated, the preferred form of the resin is a liquid. Other commercially available epoxy resins, which may be suitable in the present invention include, but are not limited to DER 317, DER 337 and DER 324. A resin forms from about 35% to about 99% by weight of the first or resin component and more preferably from about 65% to about 98% by weight of the composition of the present invention.

It is contemplated that the resin component of the present invention may also be formulated with a blowing agent and, more particularly, a blowing agent having a thermoplastic shell with a solvent core. Because epoxies normally react with a curing agent without evolving volatiles, the addition of a blowing agent is typically required to create a foamed product. The blowing agent may be a chemical agent, (i.e. one that thermally decomposes and evolves gas due to the heat of the exothermic epoxy reaction), or a physical agent, which simply vaporizes at its boiling temperature to liberate gas. In the event that a chemical blowing agent is used, particle size of the blowing agent may be adjusted so as to provide the desired foaming characteristics in the cured foam. For example, smaller particle sizes tend to provide foams having more uniform cell structure. In some alternative formulations of the present invention, it may be desirable to also use a blowing agent activator or accelerator so as to lower the temperature at which release of gas from the blowing agent takes place. Suitable chemical blowing agent activators include, but are not limited to, ureas (such as the surface-coated, oil-treated urea sold by Uniroyal Chemicals under the trademark BIKOT) polyols, organic acids, amines, and lead, zinc, tin, calcium and cadmium oxides and salts (including carboxylic acid salts).

Typically, from about 0.1% to about 2% of a blowing agent based on the weight of the foamable composition is employed, although the optimum amount will of course vary depending upon the activator/accelerator selected, the amount of blowing agent, cure temperature and other variables. An example of a preferred physical blowing agent, which according to the present invention is formulated with the first or resin component, is sold under the trade name Expancel 820-DU. Most preferably, the solvent core of the blowing agent of the present invention is a liquid.

Amine Component

The amine component of the present invention may be formulated with a curing agent, which enables the material to achieve modulus or glass transition temperature compared to materials found in the prior art but is still capable of significant plastic deformation following curing. In addition, the preferred amine component facilitates a cured structural material having improved mechanical properties such as higher compressive strain to failure when compared with materials produced using traditional curing agents. The presence of the enhanced mechanical properties is particularly useful in structural reinforcement applications found in the automotive industry but whose utility is not limited to such applications. Accordingly, the cross-linking of the first or resin component utilized in the present invention may be accomplished by the addition of any of the chemical materials known in the art for curing such resins. Such materials are referred to herein as "curing agents", but also include the substances known to workers in the field as curatives, hardeners, activators, catalysts or accelerators. While certain curing agents promote curing by catalytic action, others participate directly in the reaction of the resin and are incorporated into the thermoset polymeric network formed by condensation, chain-extension and/or cross-linking of the synthetic resin. When the thermosettable synthetic resin is an epoxy resin, it may be particularly desirable to employ at least one curing agent, which is a nitrogen-containing compound. Such curatives (along with other curatives useful for hardening epoxy resins) are described in the chapter in the Encyclopedia of Polymer Science and Engineering referenced above. Suitable compounds useful as curing agents include amines, amino compounds, amine salts, and quaternary ammonium compounds. While any type of amine could be used, it is contemplated that suitable amine components for formulation in the present invention include cycloaliphatic amine curing agents which have a long cure time, relative to other commercially available curing agents, with epoxy resins and serves to increase the glass transition temperature of the cured epoxy, thereby increasing mechanical stability at higher temperatures. A particularly preferred amine utilized in the present invention is sold by Air Products under the trade name Ancamine 2556.

Additive(s)

Further, the present invention comprises the formulation of additional additive component(s), which will cause either or both of the components described above to enable shear thinning to enhance processing attributes of the material. One such additive component of the present invention includes a filler. Typically, fillers are added to epoxy foam formulations to lower cost, alter color, reduce reaction exotherm, and control shrinkage rates. Fillers in the form of fine particles (for example, carbon black or fumed silica) may also serve as nucleating agents. Small particles provide sites for heterogeneous nucleation, which allow for initiation and subsequent growth of foam cells when certain blowing agent types are used. In heterogeneous nucleation, gas molecules driven by supersaturation preferentially form nucleation sites on the solid/fluid interfaces of the nucleating agent. The ultimate cell size is determined by other factors including the exotherm, the rate of cure, the amount of blowing agent, and interactions between the epoxy and other formulation components. Although a number of suitable fillers are known in the art and discussed in commonly-assigned U.S. Pat. No. 5,648,401, incorporated by reference, a particular preferred additive of the present invention is a thixotropic additive formulated within either or potentially both of the first and second components which causes both components to be shear-thinning. An example of such a thixotropic filler is an aramid pulp and is sold under the trade name Kevlar 1F543. In a particularly preferred embodiment, the thixoptropic filler is formulated in at least one, and potentially both the first or epoxy component and the second or amine component. This additive effectuates shear thinning or an increased viscosity at a zero shear rate and a decreased viscosity at a higher shear rate.

Still further, a number of other additives can be utilized in the present invention such as carbon black, solid rubber particles, hollow microspheres, and inert polymer particles, if desired in a particular application. For example, hollow glass microspheres may be added to reduce the density of the foam while maintaining good strength and stiffness. Commercially available hollow glass microspheres (sometimes also referred to as glass microballoons or microbubbles) include materials sold by Minnesota Mining & Manufacturing under the trademark SCOTCHLITE, with suitable grades including those available under the designations B38, C15, K20, and VS 5500. The glass microspheres preferably have diameters in the range of from about 5 to 200 micrometers. The crush strength of the hollow glass microspheres may be selected in accordance with the desired characteristics of the cured thermoset foam or chosen reinforced structural member containing such foam. Suitable reinforcements may be included as well. For instance, glass fiber is one type of reinforcement since it helps increase the strength and stiffness of the standard reinforcement foam. The glass fiber may be chopped, milled, or in other suitable physical form.

Other types of fillers or reinforcements may also optionally be present in the foamable composition. Any of the conventional organic or inorganic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), fibers other than glass fibers (e.g., wollastinite fibers, carbon fibers, ceramic fibers, aramid fibers), alumina, clays, sand, metals (e.g. aluminum powder), microspheres other than glass microspheres such as ceramic microspheres, thermoplastic resin microspheres, thermoset rein microspheres, and carbon microspheres (all of which may be solid or hollow, expanded or expandable) and the like.

Other optional additives or components which could be utilized in alternative embodiments or formulations of the present invention include diluents (reactive or non-reactive) such as glycidyl ethers, glycidyl esters, acrylics, solvents and plasticizers, toughening or flexibilizing agents (e.g., aliphatic diepoxides, polyaminoamides, liquid polysulfide polymers, rubbers including liquid nitrile rubbers such as butadiene-acrylonitile copolymers, which may be functionalized with carboxyl groups, amine groups or the like), coupling agents/wetting agents/adhesion promoters (e.g., silanes), colorants (e.g., dyes and pigments such as carbon black), stabilizers (e.g., antioxidants, UV stabilizers) and the like. In this regard, the preferred formulation set forth below may utilize these additional components such as an optional coloring agent, reinforcements and fillers.

Although the components of the present invention may be formulated in a variety of ranges as disclosed herein, the following table sets forth a preferred formulation in percent by weight for the components of the composition of the present invention:

|  | (weight %) |
| --- | --- |
| First Component (Epoxy) | |
| DER 331 | 97.943 |
| Kevlar 1F543 | 0.748 |
| Expancel 820-DU | 0.935 |
| Phtalo Green | 0.374 |
| Second Component (Amine) | |
| Ancamine 2556 | 60.714 |
| GVI 4040 | 12.500 |
| Kevlar 1F543 | 1.786 |
| Polyfil 90 | 12.500 |
| Nanomer I.30.E | 12.500 |

In the method of the present invention, the first or resin component and the second or amine component are combined, preferably in liquid form. For example, the materials can be mixed either statically or dynamically with the mixture then being placed in a mold cavity of chosen shape and dimension, the mold cavity can be an automotive body cavity or any cavity that could be structurally reinforced by the foam-in-place structural material. In an alternative embodiment or methodology, atomized streams of the separate components or materials can be impinged into a mold cavity. The thixotropic filler and the resin are preferably premixed. Once mixed, the composition cures at room temperature (that is, without adding external heat).

It is contemplated that the method, apparatus, and formulation comprising the present invention is suitable for application, and may be used in conjunction with, a variety of substrates and members used for reinforcement of automotive and aerospace vehicles. Most notably, the present invention may be applied, coated, or otherwise disposed upon substrates found within portions of an automotive vehicle such as surfaces or members encompassing on automotive rockers, rail members, frame members, crossmembers, chassis engine cradles, roof systems, vehicle window frames, vehicle deck lids, lift gates, roof bows, lift gates, roof headers, roof rails, fender assemblies, pillar assemblies, door assemblies, radiator/rad supports, bumpers, a rail member, a frame member, a door assembly, a rocker, a frame cross member, a vehicle window frame, a vehicle deck lid, a lift gate, a vehicle pillar assembly, a vehicle hatch, a vehicle roof system, a roof bow, a roof rail, a roof header, a fender assembly, a bumper, and a front end structure, body panels such as hoods, trunks, hatches, cargo doors, front end structures, and door impact bars in automotive vehicles as well as other portions of an automotive vehicle which may be adjacent to the exterior of the vehicle. The targeted placement of the present invention within an automotive vehicle will be dictated by performance requirements and economics of the specific application and requirements. In addition, the present invention may be utilized in conjunction with a structural reinforcement system such as those disclosed in U.S. Pat. Nos. 4,922,596, 4,978,562, 5,124,186, and 5,884,960 and commonly owned, co-pending U.S. application Ser. Nos. 09/502,686 filed Feb. 11, 2000, 09/524,961 filed Mar. 14, 2000, 60/223,667 filed Aug. 7, 2000, 60/225,126 filed Aug. 14, 2000, 09/676,443 filed Sep. 29, 2000, 09/676,335 filed Sep. 29, 2000, 09/676,725 filed Sep. 29, 2000, and particularly, 09/459,756 filed Dec. 10, 1999, all of which are expressly incorporated by reference.

Thus, it is apparent that there has been provided in accordance with the invention a method and apparatus that fully satisfy the objects, aims and advantages set forth above. While the invention has been described in connection with specific embodiments thereof it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A method for producing a foamed article, comprising the steps of:

providing an epoxy component, said epoxy component comprising an epoxy resin, a blowing agent having a thermoplastic shell filled with a solvent core, said epoxy component being provided in a substantially liquid form;

providing an amine component, said amine component comprising an amine and a thixotropic filler, said amine component being provided in a substantially liquid form; and combining said epoxy component in its liquid form and said amine component in its liquid form thereby forming a reactive mixture and allowing said thermoplastic shell filled with a solvent core to soften from amine-epoxy exotherm and then expand due to gas pressure from said solvent core without addition of external heat.

2. The method for producing a foamed article recited in claim 1, wherein said epoxy resin comprises from about 35% to about 95% by weight of said reactive mixture.

3. The method for producing a foamed article recited in claim 1, further including the step of combining said blowing agent with an inert filler followed by combining said blowing agent with said epoxy resin.

4. The method for producing a foamed article recited in claim 1, wherein said reactive mixture further includes an additive selected form the group consisting of carbon black, ceramic microspheres, polymer particles, rubber particles, ceramic particles, inert mineral particles and combinations thereof.

5. The method for producing a foamed article recited in claim 1, further comprising, providing the reactive mixture within an automotive body cavity contemporaneously with the formation of the mixture or shortly thereafter.

6. The method of producing a foamed article recited in claim 5, wherein said cavity is at least partially provided by a component of an automotive vehicle selected from a rail member, a frame member, a door assembly, a rocker, a frame cross member, a vehicle window frame, a vehicle deck lid, a lift gate, a vehicle pillar assembly or a vehicle latch.

7. The method for producing a foamed article recited in claim 1, wherein the epoxy component includes a chemical selected from an epoxidated polyolefin, an epoxidated phenolic-novolac resin, a polyglycidyl ester, a glycidylether ester or a polyglycidyl ether.

8. The method for producing a foamed article recited in claim 7, wherein the amine component includes a chemical selected from an amino compound, an amine salt or a quarternary ammonium compound.

9. A method for producing a foamed article, comprising the steps of:
providing an epoxy component, said epoxy component comprising an epoxy resin, a thixotropic filler and a blowing agent having a thermoplastic shell filled with a solvent core, the thixotropic filler being an aramid pulp, said epoxy component being provided in a substantially liquid form;
providing an amine component, said amine component comprising a cycloaliphatic amine curing agent, said amine component being provided in a substantially liquid form; and
combining said epoxy component in its liquid form and said amine component in its liquid form thereby forming a reactive mixture and allowing said thermoplastic shell filled with a solvent core to soften from amine-epoxy exotherm and then expand due to gas pressure from said solvent core without addition of external heat.

10. The method for producing a foamed article recited in claim 9, wherein said epoxy resin comprises from about 35% to about 95% by weight of said reactive mixture.

11. The method for producing a foamed article recited in claim 9, wherein said epoxy resin and said thixotropic filler are combined prior to adding said blowing agent.

12. The method for producing a foamed article recited in claim 11, further including the step of combining said blowing agent with an inert filler prior to combining said blowing agent with said epoxy resin and said thixotropic filler.

13. The method for producing a foamed article recited in claim 9, further comprising, providing the reactive mixture within an automotive body cavity contemporaneously with the formation of the mixture or shortly thereafter.

14. The method for producing a foamed article recited in claim 9, wherein the epoxy component includes a chemical selected from an epoxidated polyolefin, an epoxidated phenolic-novolac resin, a polyglycidyl ester, a glycidylether ester or a polyglycidyl ether.

15. The method for producing a foamed article recited in claim 9, wherein the amine component includes a chemical selected from an amino compound, an amine salt or a quarternary ammonium compound.

16. A method for producing a foamed article, comprising the steps of:
providing a substantially liquid epoxy component that includes:
i) an epoxy resin; and
ii) a blowing agent having a thermoplastic shell filled with a solvent core;
providing a substantially liquid amine component that includes:
i) a cycloaliphatic amine curing agent; and
ii) an amine that is less reactive than the cycloaliphatic curing agent;
combining and dispensing said liquid epoxy component and said liquid amine component at around room temperature to form a reactive mixture wherein:
i) the epoxy component and the amine component are formed as separate liquids prior to forming the reactive mixture;
ii) the epoxy component and the amine component react together exothermically to produce heat; and
iii) the heat causes the thermoplastic shell filled with a solvent core to soften and expand due to gas pressure from said solvent core without addition of external heat;
providing the reactive mixture within an automotive body cavity contemporaneously with the formation of the mixture or shortly thereafter; and
allowing the reactive mixture to cure to form said foamed article wherein said foamed article is capable of substantial plastic deformation after curing without substantial loss of strength modulus and wherein said foamed article has a glass transition temperature greater than 200° F. after such plastic deformation.

17. The method of producing a foamed article recited in claim 16, wherein said cavity is at least partially provided by a component of an automotive vehicle selected from a rail member, a frame member, a door assembly, a rocker or a frame cross member.

18. The method of producing a foamed article recited in claim 16, wherein said cavity is at least partially provided by a component of an automotive vehicle selected from a vehicle window frame, a vehicle deck lid, a lift gate, a vehicle pillar assembly or a vehicle latch.

19. The method for producing a foamed article recited in claim 16, wherein the epoxy component includes a thixotropic filler.

20. The method for producing a foamed article recited in claim 19, wherein the amine component includes a thixotropic filler.

* * * * *